US008484310B2

(12) United States Patent
Aarts

(10) Patent No.: US 8,484,310 B2
(45) Date of Patent: Jul. 9, 2013

(54) METHOD OF SUPPLYING ADVERTISING CONTENT

(75) Inventor: Roberts Aarts, Espoo (FI)

(73) Assignee: Hewlett-Packard Development Company, L.P., Houston, TX (US)

(*) Notice: Subject to any disclaimer, the term of this patent is extended or adjusted under 35 U.S.C. 154(b) by 510 days.

(21) Appl. No.: 12/099,489

(22) Filed: Apr. 8, 2008

(65) Prior Publication Data

US 2008/0256216 A1 Oct. 16, 2008

(30) Foreign Application Priority Data

Apr. 16, 2007 (EP) .................................. 07106253

(51) Int. Cl.
G06F 15/16 (2006.01)

(52) U.S. Cl.
USPC ........................... 709/217; 709/218; 709/227

(58) Field of Classification Search
USPC ......................................... 709/217–218, 227
See application file for complete search history.

(56) References Cited

U.S. PATENT DOCUMENTS

| 7,136,875 B2* | 11/2006 | Anderson et al. .......... 707/104.1 |
| 2001/0007097 A1 | 7/2001 | Kim | |
| 2002/0010756 A1* | 1/2002 | Oku ............................... 709/217 |
| 2002/0112013 A1* | 8/2002 | Walsh ........................... 709/206 |
| 2002/0133412 A1 | 9/2002 | Oliver | |
| 2003/0131102 A1* | 7/2003 | Umbreit ........................ 709/224 |
| 2004/0230593 A1* | 11/2004 | Rudin et al. .................. 707/100 |
| 2006/0190616 A1* | 8/2006 | Mayerhofer et al. ......... 709/231 |
| 2006/0248209 A1* | 11/2006 | Chiu et al. .................... 709/231 |
| 2007/0044146 A1* | 2/2007 | Murase et al. ................. 726/10 |
| 2007/0067297 A1* | 3/2007 | Kublickis ......................... 707/9 |

FOREIGN PATENT DOCUMENTS

| WO | WO-01/15036 | 3/2001 |
| WO | WO-2004/030338 | 4/2004 |
| WO | WO 2006073238 A1 * | 7/2006 |

OTHER PUBLICATIONS

Farley et al., "Mobile Web Services," BT Technology Journal, vol. 23, No. 3, Kluwer Academic Publishers, Jul. 1, 2005, pp. 202-213.

* cited by examiner

Primary Examiner — Chau Le

(57) ABSTRACT

A method of supplying advertising content, a method comprising the steps of receiving content data, the data comprising metadata identifying an advertisement service, transmitting a data request to the advertisement service in accordance with the metadata, transmitting an authentication request to an authentication server, receiving an authentication response, the authentication response comprising user information, and transmitting advertisement information in accordance with the user information.

17 Claims, 5 Drawing Sheets

METHOD OF SUPPLYING ADVERTISING CONTENT

This application claims priority from European Patent Application 07106253.3, filed on Apr. 16, 2007. The entire content of the aforementioned application is incorporated herein by reference.

DESCRIPTION OF INVENTION

This invention relates to a method of supplying advertising content and an apparatus for supplying advertising information, particularly but not exclusively for supplying advertising information in accordance with user information along with content information.

BACKGROUND OF THE INVENTION

The provision and display of advertisements to users of the internet is well known. It is further known to attempt to personalise the advertisements supplied to a particular user, in general by maintaining a user profile corresponding to some characteristics of the user, and supplying advertisement information in accordance with the user profile. The user profile information may simply categorise the user in accordance with demographic terms, such as age, gender or geographical location, or may be a more detailed profile based on the user's recorded browsing habits, purchasing patterns or indeed on information voluntarily submitted by a user.

Where such profiles are maintained and stored, there are potential problems with user privacy, in that personal or private information may be made available to third parties in a manner which is not desirable to the user. This is particularly the case where the user can be personally identified by information stored in the profile and made available to third party systems.

Another issue that arises in connection with providing advertisements is where the content information requested and received by the user is not in response to, for example, a single page request generated by the user, but is broadcast content information transmitted to a number of users. Such content data may for example comprise a Digital Video Broadcasting (DVB) broadcast, internet radio, podcasts, and other visual or audio content transmitted to a plurality of users. Where such broadcast content is provided to a large number of users, any advertisement transmitted with the content will of necessity be generic and non-personalised, although the advertisements may of course be selected in accordance with the transmitted content.

SUMMARY OF THE INVENTION

According to a first aspect of the invention, we provide a method of supplying advertising content, the method comprising the steps of receiving content data, the data comprising metadata identifying an advertisement service, transmitting a data request to the advertisement service in accordance with the metadata, transmitting an authentication request to an authentication server, receiving an authentication response, the authentication response comprising user information, and transmitting advertisement information in accordance with the user information.

The content data may comprise broadcast content data.

The step of transmitting an authentication request may comprise transmitting the authentication request to a federated authentication service.

The data request may be sent by a user device and the authentication service may communicate with the user device to verify the authentication request before transmitting the authentication response.

The method may further comprise the step of transmitting user device configuration information and the step of transmitting advertisement information may comprise transmitting advertisement information in accordance with the user device configuration information.

The user information may comprise demographic information corresponding to the user.

The method may comprise the step of receiving the advertisement information and generating an output in accordance with the advertisement information.

The method may comprise providing a persistent identifier corresponding to the user and tracking advertisement information sent to the user identified by the persistent identifier.

According to a second aspect of the invention, we provide an apparatus operable to perform the method according to the first aspect of the invention, the apparatus comprising a user device operable to generate an output in accordance with the content data and the advertisement data and an advertisement server operable to receive the data request from the user device, transmit an authentication request to an authentication service, receive an authentication response from the authentication service comprising user information, and retrieve advertisement information in accordance with the user information and transmit it to the user device.

BRIEF DESCRIPTION OF THE DRAWINGS

An embodiment of the invention will now be described by way of example only with reference to the accompanying drawings, wherein.

DETAILED DESCRIPTION OF THE PREFERRED EMBODIMENT

Figure 1:
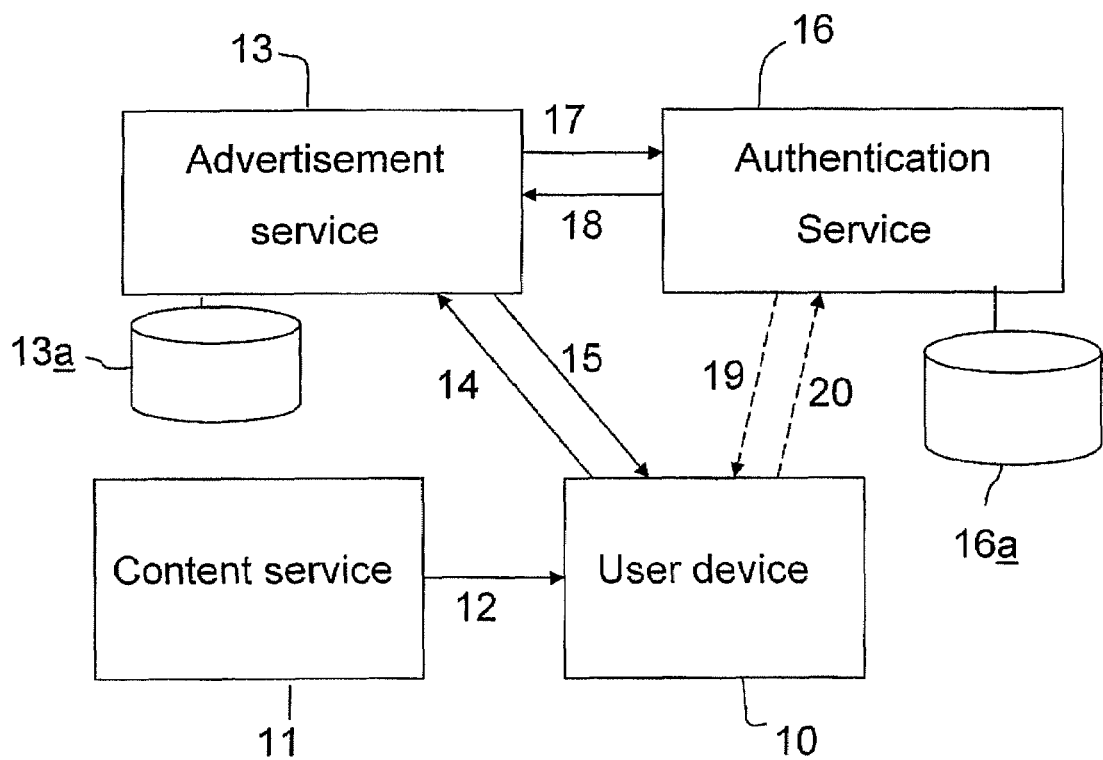
FIG. 1 is a diagrammatic illustration of an apparatus embodying the present invention.

Referring to FIG. 1, a user device is shown generally at 10. The user device may be any suitable apparatus operable to receive digital content information and present it to a user. The user device may therefore be a personal computer receiving streamed data or other content data from the Internet, but may alternatively be a wireless computing device, or an entertainment system such as a cable or satellite receiver, or any other appropriate device as required. The user device receives content information from a content service 11 as shown by arrow 12. The content service again may be any suitable supplier data source, and so accordingly may be a web server serving a digital page transmission, a web server providing streamed audio or visual content, or a satellite or wireless broadcasting transmitting appropriate content information. An advertisement service is shown at 13. The advertised service stores advertisement information in store 13a, and may also track advertisement data sent to a particular user or device. The advertisement device is operable to receive a data request 14 from the user device 10 and return advertisement information as shown at 15 in accordance with the request. An authentication service is shown at 16 operable to receive an authentication request 17 from the advertisement service and return an authentication response 18. The authentication service 16 has a store 16a in which information corresponding to identified users is held, to permit the authentication service 16 to perform the verification and supply user information. As shown by arrows 19 and 20, the authentication service 16 may be operable to authenticate the user apparatus 10 in response to the authentication request 17 by communicating with the user device 10.

Figure 2:
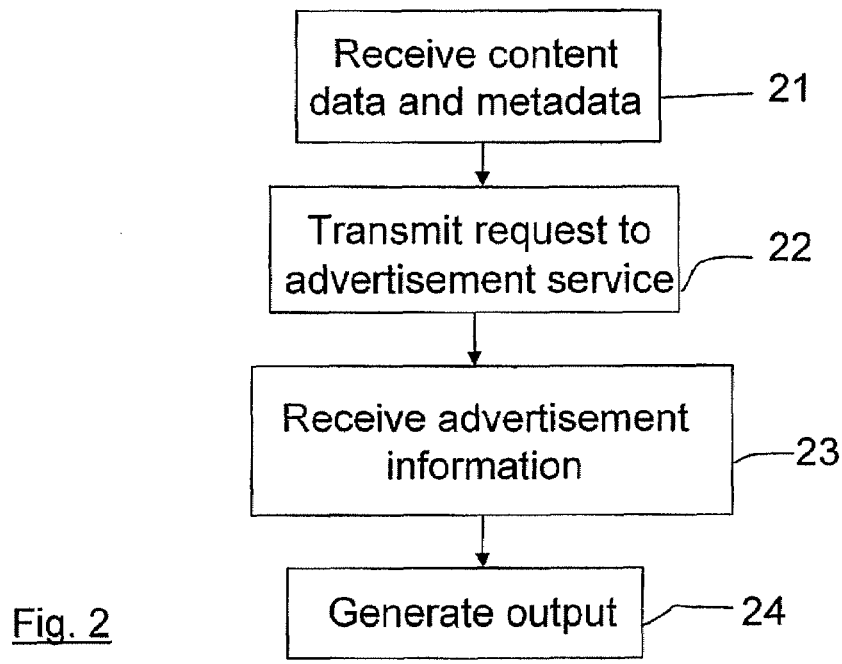
FIG. 2 is a flow chart showing a method of operating a user device.
Figure 3:
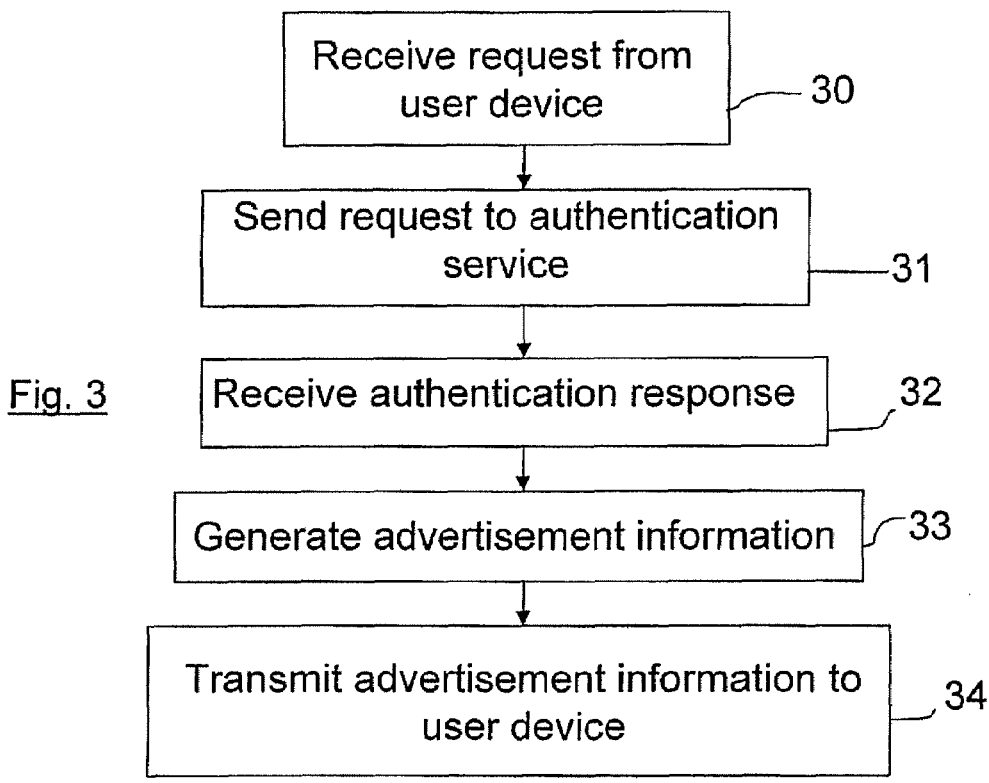
FIG. 3 is a flow chart showing a method of authorising an advertisement service.

The system of FIG. 1 operates as follows, With reference to FIG. 2, at step 21 the user device 10 receives data including content information from the content service 11, the content information comprising content data to be used in providing an output to the user, and metadata to enable appropriate advertisement information to be obtained. The metadata comprises a reference or pointer to the advertisement service 13. At step 22, the user device 10 therefore transmits a data request to the advertisement service 13 in accordance with the metadata received in the content information. At step 23, the user device receives advertisement information from the advertisement service 13, and at step 24 generates an output in accordance with the newly received content information and advertisement information.

The advertisement service operates as follows. At step 30, the advertisement service 13 receives the data request from the user device 10. At step 31, the advertisement service 13 transmits an authentication request 17 to the authentication server 16. This authentication request may, for example, comprise an identifier corresponding to the user device 10, or any other information appropriate to enable the authentication service to identify the user device 10 such as network layer information. At step 32 the advertisement service 13 receives an authentication response from the authentication service 16, the authentication response comprises information corresponding to a user of the user device 10. Preferably, no identifying user information is provided, that is the user may not be identified from the transmitted information. The authentication service 16 transmits general information thus allowing an advertisement to be personalised to the user, such as age, gender, geographic information or any other information as appropriate. At step 33, the advertisement service generates advertisement information in accordance with the received authentication information, and at step 34 transmits the advertisement information to the user device 10.

Figure 4:
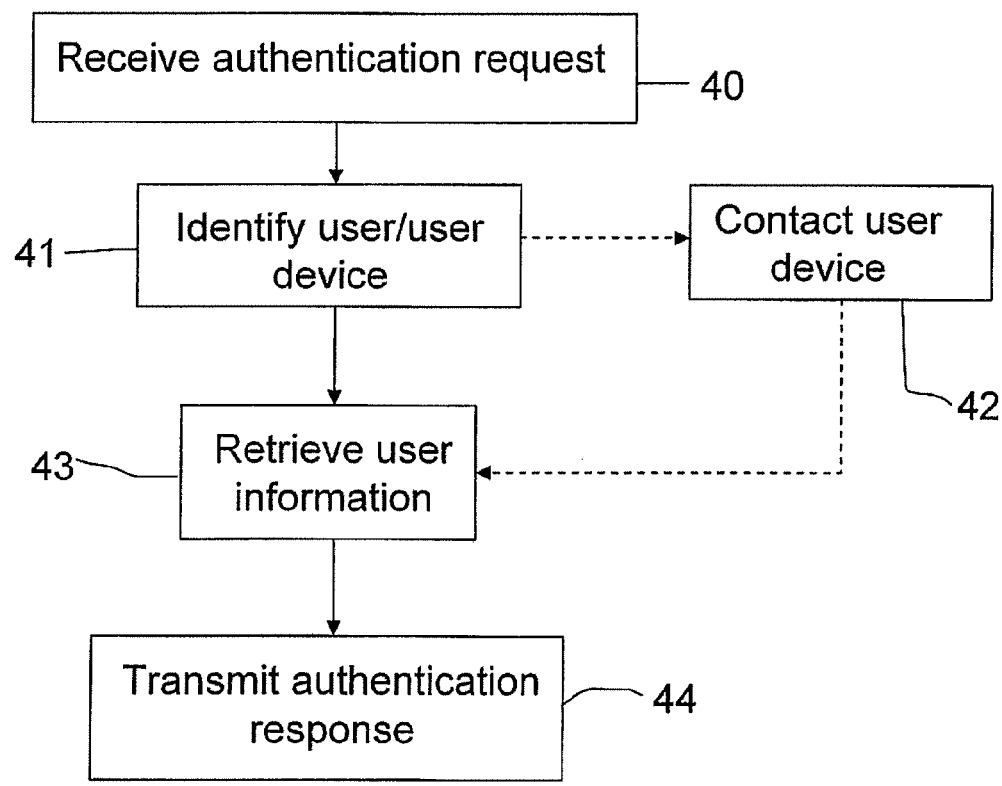
FIG. 4 is a flow chart showing a method of operating an authentication service.

As shown in FIG. 4, the authentication service operates as follows. At step 40, the authentication service 16 receives the authentication request 17 from the advertisement service 13. At step 41, the authentication service identifies the user or user device 10 from the information transmitted in the authentication request 17. The data request sent by the user device to the advertisement service 13 may include any appropriate identifier information, identifying the user device 10 or identifying the user in a manner recognised by the authentication service 16, and at step 41 the authentication service acts on the information to identify the user device 10 as appropriate. The information supplied in step 17 may be sufficient, or alternatively, as illustrated in step 42, the authentication service 16 may communicate with the user device 10 to verify the authentication request, for example to verify the information contained in the authentication request 17 or otherwise verify or confirm the identity of the user device 10 or user. If the identification step 41, or 42 is successful, then at step 43, the authentication service 16 extracts appropriate user information from the user information store 16a and transmits the authentication response included in the user information to the advertisement service 13 as shown at step 44.

Advantageously, the authentication service 16 comprises a federated authentication service such that the user information stored in the information store 16a may be made available to receive a plurality of separate, independent services. By providing the authentication service 16 as a federated authentication service, the advertisement service 13 does not need to access or maintain a specific user profile database for the purposes of controlling the advertisement information sent by the advertisement service 13. Similarly, the user device 10 does not need to store the user profile information locally and transmit that information with every request sent to a service such as the advertisement service 13. The method described herein thus permits the advertisement service 13 to obtain some user information without receiving information which identifies the user, and indeed no user information is transmitted back to the content service 11. By providing a persistent identifier, the advertisement service 13 may track advertisements which have been sent to the user device 10 to reduce or avoid repeatedly sending the same advertisements.

Advantageously, as part of the data request 14, the user device 10 can transmit user device configuration information, such that the advertisement service 13 is operable to transmit advertisement information 15 in an appropriate format or configuration to suit the user device 10.

Accordingly, advertisement content is provided to a user device 10 along with suitable content information, but without compromising the privacy or releasing personal information of any user.

The system and method discussed above is advantageous in that the advertisement service 13 may operate with a number of different authentication services 16 and the content service 11 need not know about the authentication services 16. However, in some circumstances, it may be preferable or desirable for the method steps to be performed by other entities of the system or in a different order as described above.

Figure 5:
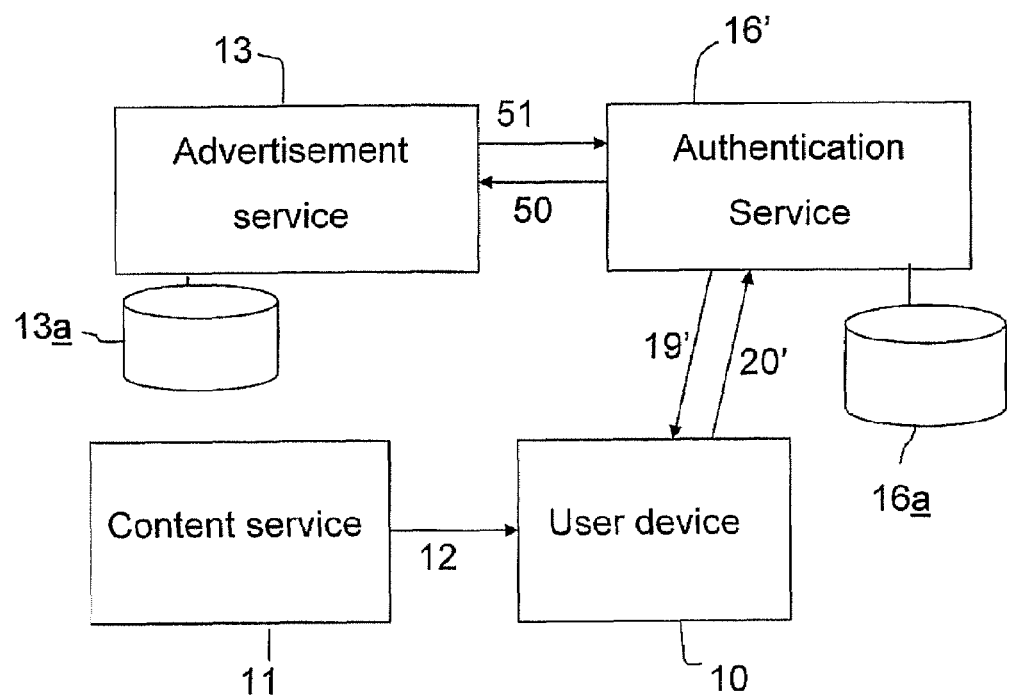
FIG. 5 is a diagrammatic illustration of a further apparatus embodying the present invention.

In the system of FIG. 5, for example, the user device 10 receives content data and metadata as described above, but in this example the metadata comprises a pointer to authentications service 16'. The user device 10 contacts authentication service 16' as shown by arrow 20', and the authentication service 16' authenticates the user device 10 as discussed above. In this example, however, the authentication device 16' also contacts the advertisement service 13 as shown by arrow 50, providing appropriate user information and possibly device information in a similar manner as in step 44 above. The authentication service 16' receives the advertisement information as shown by arrow 51 and forwards it to the user device 10 for presentation to the user as shown by arrow 19'.

Figure 6:
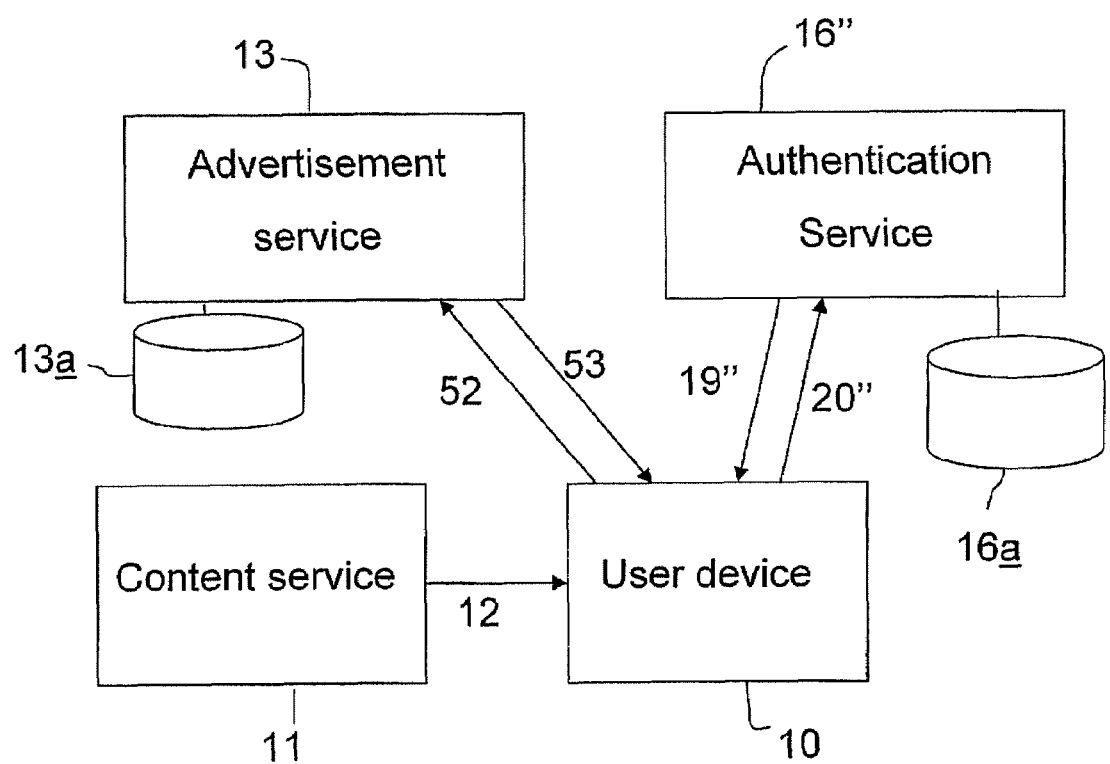
FIG. 6 is a diagrammatic illustration of a yet further apparatus embodying the present invention

In a further example as shown in FIG. 6, the metadata comprises a pointer to authentication service 16", and the user device 10 contacts the authentication service 16" as shown by arrow 20".

The authentication service 16" authenticates the user device 10 as discussed above, and as shown by arrow 19" responds with instructions to contact the advertisement service 13, where the instructions include the user information. The user device 10 then contacts the advertisement service 13 as shown by arrow 52, supplying the user information, and receives the advertisement information as shown by arrow 53.

The examples of FIGS. 5 and 6 may be desirable in some circumstances. For example, if the user device 10 comprises a mobile telephone receiving streamed content from a mobile telephone operator, it will be appropriate for the user device 10 to contact the authorisation service of the mobile telephone operator directly. This is advantageous in that fewer messages are transmitted, but may be disadvantageous in that the content service 11 must supply a reference to the authorisation service 16', 16".

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method for supplying advertising content, the method comprising:
    transmitting content data from a content server to a user device of a user, the content data comprising metadata identifying an advertisement service;
    receiving at the advertisement service a data request for advertisement information from the user device in accordance with the metadata, the data request comprising identifier information identifying the user in a manner recognized by an authentication service, where the identifier information does not identify the user to the advertisement service;
    in response to the receiving at the advertisement service, transmitting an authentication request by the advertisement service to said authentication service, the authentication request comprising the identifier information from the data request and network layer information;
    receiving an authentication response at the advertisement service from the authentication service, the authentication response comprising user information which does not comprise personal identification of said user; and
    in response to the receiving an authentication response at the advertisement service, transmitting advertisement information to the user device in accordance with the user information, where no user information is transmitted to the content server.

2. The method according to claim 1, wherein the content data comprises broadcast content data.

3. The method according to claim 1, wherein the step of transmitting an authentication request comprises transmitting the authentication request to a federated authentication service, wherein the user information is accessed by the authorization service from an information store and the information store is made available to a plurality of separate, independent other authentication services.

4. The method according to claim 1, wherein the authentication service communicates with the user device to verify the authentication request before transmitting the authentication response.

5. The method according to claim 1, comprising:
    transmitting user device configuration information and wherein the step of transmitting advertisement information comprises transmitting advertisement information in accordance with the user device configuration information.

6. The method according to claim 1, wherein the user information comprises demographic information corresponding to the user.

7. The method according to claim 1, comprising:
    receiving advertisement information and generating an output in accordance with the advertisement information.

8. The method according to claim 1, comprising:
    providing a persistent identifier corresponding to the user and tracking advertisement information sent to the user identified by the persistent identifier.

9. A method for supplying advertising content, the method comprising:
    transmitting content data from a content server to a user device of a user, the content data comprising metadata identifying an advertisement service;
    receiving at the advertisement service a data request from the user device for advertisement information in accordance with the metadata,
    the data request comprising identifier information identifying the user in a manner recognized by an authentication service, where the identifier information does not identify the user to the advertisement service;
    in response to the receiving at the advertisement service, transmitting an authentication request from the advertisement service to said authentication service configured to prevent facilitating personal identification of said user, so as to provide for identification of a user by the authentication service, which is separate from the content server and the advertisement service, so as to avoid personal identification of the user by either of the content server and the advertisement service, the authentication request comprising the information identifying the user from the data request and network layer information;
    receiving an authentication response at the advertisement service from the authentication service, the authentication response comprising user information which does not provide personal identification of the user; and
    in response to the receiving an authentication response at the advertisement service, transmitting advertisement information to the user device in accordance with the user information, where no user information is transmitted to the content server.

10. The method according to claim 9, wherein the content data comprises broadcast content data.

11. The method according to claim 9, wherein said transmitting an authentication request comprises transmitting the authentication request to a federated authentication service.

12. The method according to claim 9, wherein the authentication service communicates with the user device to verify the authentication request before transmitting the authentication response.

13. The method according to claim 9, comprising:
    transmitting user device configuration information and wherein the step of transmitting advertisement information comprises transmitting advertisement information in accordance with the user device configuration information.

14. The method according to claim 9, wherein the user information comprises demographic information corresponding to the user.

15. The method according to claim 9, comprising:
    receiving advertisement information and generating an output in accordance with the advertisement information.

16. The method according to claim 9, comprising:
providing a persistent identifier corresponding to the user and tracking advertisement information sent to the user identified by the persistent identifier.

17. A method for supplying advertising content, the method comprising:
transmitting content data from a content server to a mobile device of a user, the content data comprising metadata identifying an advertisement service and a pointer to an authentication service separate from said advertisement service and said content server;
receiving at the authentication service a request from the mobile device for authentication of the mobile device, the data request comprising network layer information and identifier information identifying one of the user or mobile device in a manner recognized by the authentication service;
in response to the receiving at the authentication service, generating an authentication response at the authentication service, the authentication response comprising user information that does not provide personal identification of said user;
receiving the user information at the advertisement service, where the advertisement service does not maintain a user profile database,
in response to the receiving the user information at the advertisement service, transmitting from the advertisement service to said authentication service advertisement information selected in accordance with the user information;
transmitting from said authentication service to the mobile device said advertisement information; and
generating at the mobile device an output in accordance with received content information data and the advertisement information, where no user information is transmitted to the content server.

* * * * *